(12) United States Patent
Boes

(10) Patent No.: US 7,891,740 B2
(45) Date of Patent: Feb. 22, 2011

(54) COMPOSITE VEHICLE SEAT FRAME

(75) Inventor: Klaus Boes, Allershausen (DE)

(73) Assignee: Lear Corporation, Southfield, MI (US)

( * ) Notice: Subject to any disclaimer, the term of this patent is extended or adjusted under 35 U.S.C. 154(b) by 148 days.

(21) Appl. No.: 12/180,783

(22) Filed: Jul. 28, 2008

(65) Prior Publication Data
US 2009/0058166 A1 Mar. 5, 2009

(30) Foreign Application Priority Data
Aug. 31, 2007 (DE) .................. 10 2007 041 222

(51) Int. Cl.
*A47C 7/02* (2006.01)
(52) U.S. Cl. ............... 297/452.18; 297/452.14; 297/452.65
(58) Field of Classification Search ............ 297/452.14, 297/452.18, 452.65
See application file for complete search history.

(56) References Cited

U.S. PATENT DOCUMENTS

| | | | | |
|---|---|---|---|---|
| 4,530,541 | A * | 7/1985 | Resag et al. ........... | 297/452.18 |
| 5,040,334 | A | 8/1991 | Dossin et al. | |
| 5,240,310 | A * | 8/1993 | Rink ..................... | 297/452.18 |
| 5,951,110 | A | 9/1999 | Conner et al. | |
| 6,491,346 | B1 * | 12/2002 | Gupta et al. ........... | 297/452.65 |
| 6,503,585 | B1 | 1/2003 | Wagenblast et al. | |
| 6,616,223 | B1 | 9/2003 | Lin | |
| 6,679,558 | B2 * | 1/2004 | Adams et al. .......... | 297/452.65 |
| 6,688,700 | B2 * | 2/2004 | Gupta et al. ........... | 297/452.18 |
| 6,739,673 | B2 * | 5/2004 | Gupta et al. ........... | 297/452.65 |
| 6,783,184 | B2 * | 8/2004 | DiBattista et al. ...... | 297/452.14 |
| 6,969,113 | B2 * | 11/2005 | Krawchuk .......... | 297/452.18 X |
| 6,997,515 | B2 * | 2/2006 | Gupta et al. ........... | 297/452.18 |
| 7,128,373 | B2 * | 10/2006 | Kurtycz et al. ...... | 297/452.14 X |
| 7,137,670 | B2 * | 11/2006 | Gupta et al. ........... | 297/452.65 |
| 7,377,586 | B2 * | 5/2008 | Evans ................. | 297/452.18 X |
| 2003/0020319 | A1 * | 1/2003 | Adams et al. .......... | 297/452.18 |
| 2003/0062759 | A1 * | 4/2003 | Gupta et al. ........... | 297/452.65 |
| 2003/0075968 | A1 * | 4/2003 | Gupta et al. ........... | 297/452.18 |
| 2004/0155511 | A1 * | 8/2004 | Garnweidner et al. .. | 297/452.18 |
| 2004/0155513 | A1 * | 8/2004 | Gupta et al. ........... | 297/452.65 |
| 2004/0262977 | A1 * | 12/2004 | Dibattista et al. ...... | 297/452.65 |
| 2005/0082896 | A1 * | 4/2005 | Gupta et al. ........... | 297/452.65 |
| 2005/0168041 | A1 * | 8/2005 | Glance et al. .......... | 297/452.18 |

(Continued)

FOREIGN PATENT DOCUMENTS

| | | |
|---|---|---|
| DE | 2846830 A1 | 5/1979 |
| DE | 10014332 A1 | 10/2001 |
| EP | 0962170 A2 | 12/1999 |
| GB | 2123357 A | 2/1984 |

OTHER PUBLICATIONS

German Office Action for Application No. 10 2007 041 222.5, mailed Apr. 8, 2010, 6 pages.

*Primary Examiner*—Rodney B White
(74) *Attorney, Agent, or Firm*—Brooks Kushman P.C.

(57) ABSTRACT

A vehicle seat and vehicle seat back frame are disclosed with a plastic frame substrate extending across a rear surface of a seat back. A steel frame portion is connected to the plastic frame substrate within the seat back. The steel frame portion has an upper cross member extending across an upper region of the substrate, an intermediate member extending from the upper cross member, and a lower cross member extending across the lower region of the substrate. The substrate structurally reinforces the steel frame portion with a reduced weight.

20 Claims, 4 Drawing Sheets

U.S. PATENT DOCUMENTS

| | | | |
|---|---|---|---|
| 2006/0103228 A1* | 5/2006 | Gupta et al. | 297/452.65 |
| 2007/0176480 A1* | 8/2007 | Brunner | 297/452.18 |
| 2008/0136240 A1* | 6/2008 | Matthews et al. | 297/452.18 X |
| 2010/0141009 A1* | 6/2010 | Kirch et al. | 297/452.18 |

* cited by examiner

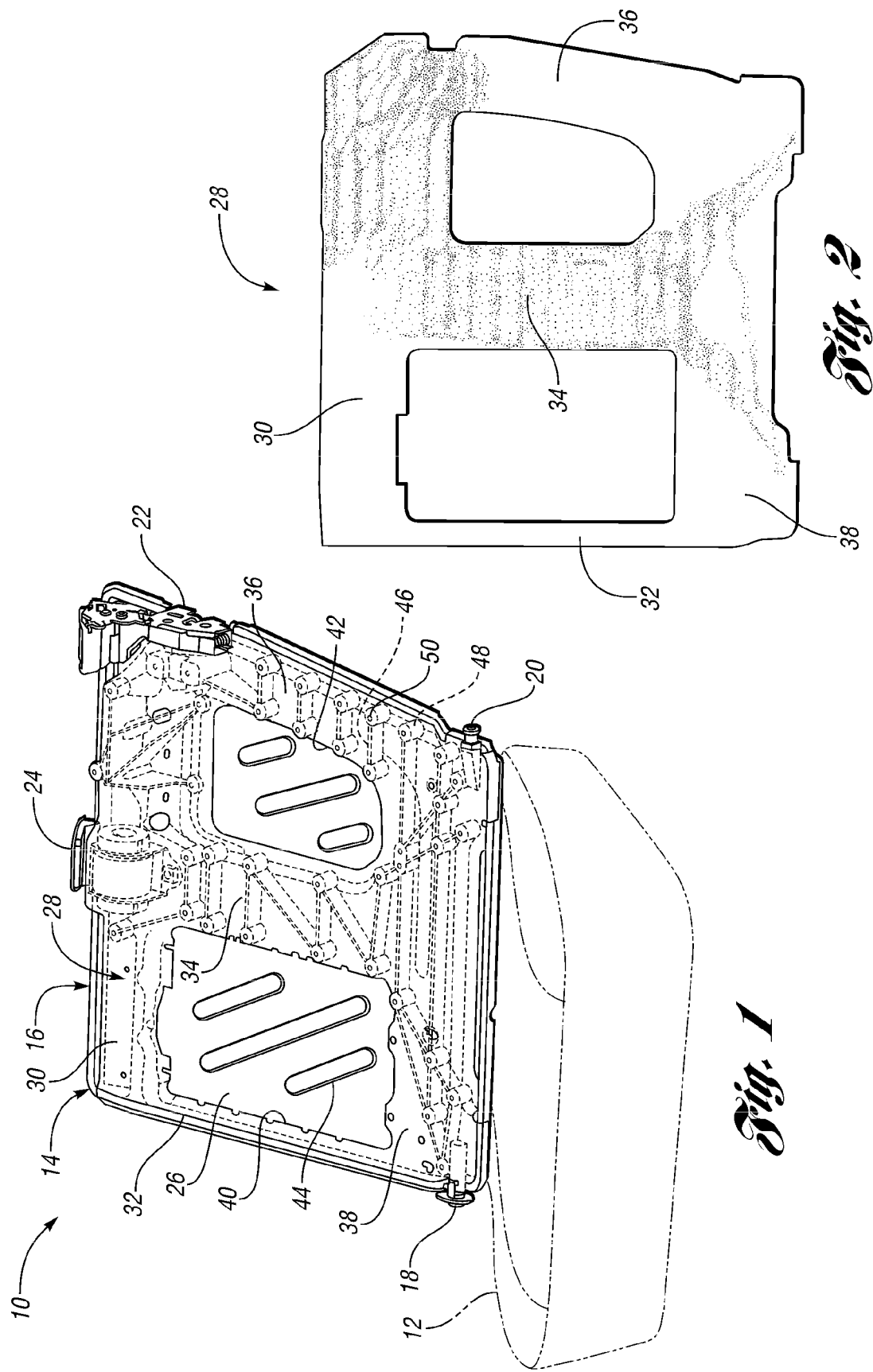

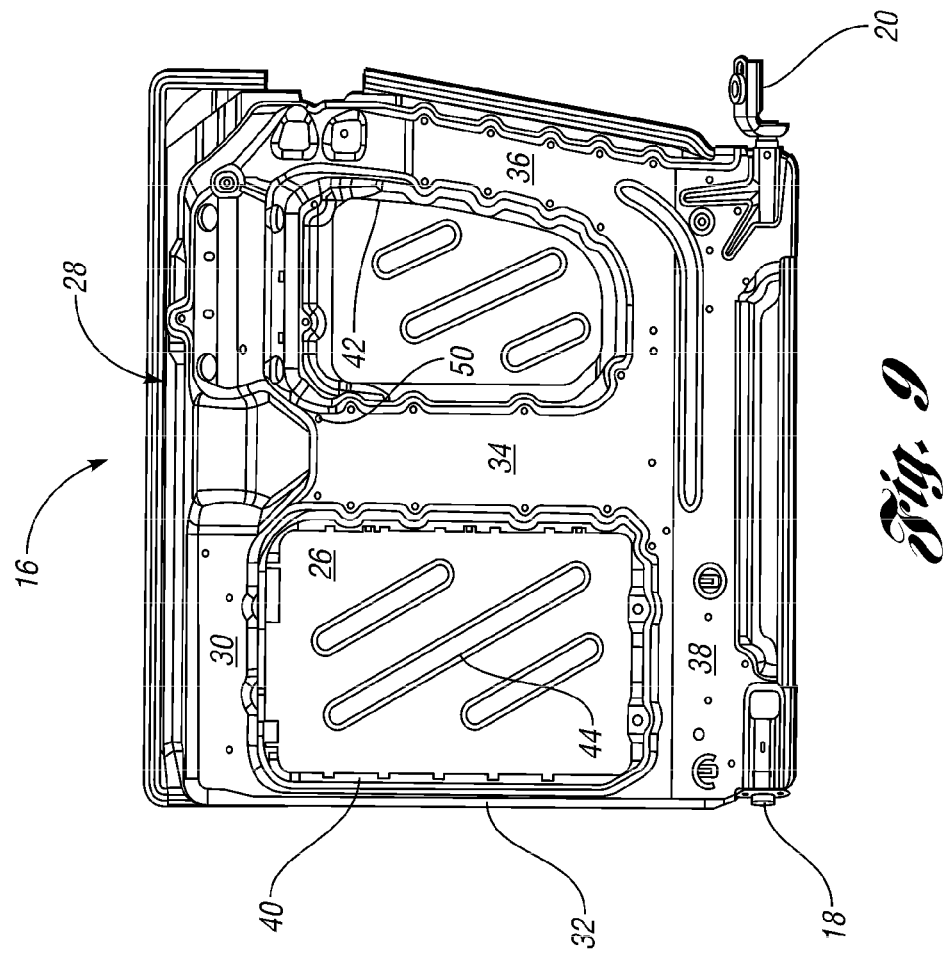
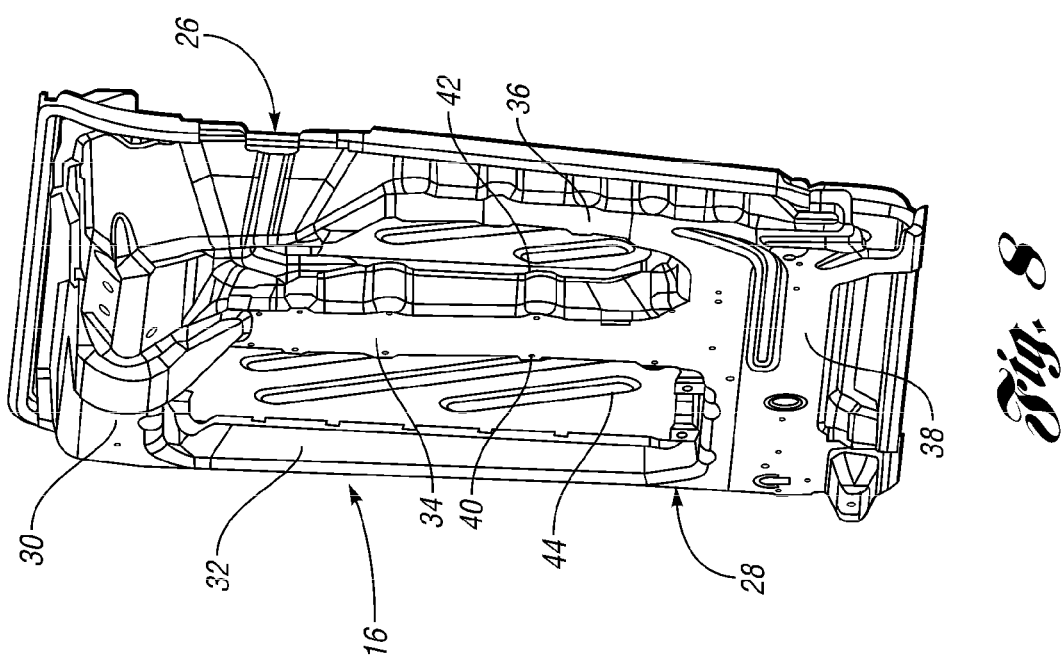

COMPOSITE VEHICLE SEAT FRAME

CROSS-REFERENCE TO RELATED APPLICATIONS

This application claims foreign priority benefits under 35 U.S.C. §119(a)-(d) to DE 10 2007 041 222.5, filed Aug. 31, 2007, which is hereby incorporated by reference in its entirety.

BACKGROUND OF THE INVENTION

1. Field of the Invention

The invention relates to vehicle seat frames.

2. Background Art

Vehicle seat frames are designed to withstand various static and dynamic loading criteria. For example, a seat back frame for a rear vehicle seat often must support a back of an occupant, while providing a wall between a passenger compartment and a cargo compartment, such as a trunk. Thus, seat back frames for rear seats often are designed to be exposed to cargo during travel. Additionally, vehicle seat back frames for rear vehicle seats are often pivotally connected to the vehicle body to provide access to the storage compartment and for permitting cargo to extend into the passenger compartment. Thus, a rear surface of the vehicle seat back provides a portion of the load floor. Therefore, the seat back frames for rear vehicle seats are often designed for supporting cargo on a rear surface of the seat back. Additionally, a rear seat back frame is designed to receive and absorb various dynamic loads such as front and rear impacts.

Rear seat back frames can be designed per option to extend across a rear seating row (full or one hundred percent). Rear seat back frames can also be designed per option as a split frame. Split frames commonly split to separate a seat back for one occupant from another seat back for two occupants; such configurations are referred to as a 60/40 seat back wherein the frame is split between a frame that provides approximately sixty percent of the seat back and a frame that provides approximately forty percent of the seat back. In order to withstand the design criteria and provide the desired seating options, vehicle seat back frames for rear vehicle seats are often designed with a closed or open steel profile to provide a high stiffness and a high modulus of elasticity for withstanding such loading. The steel frames are often welded together to form the seat back frame.

SUMMARY OF THE INVENTION

One embodiment of the present invention discloses a vehicle seat having a steel frame portion for a seat back having an upper cross member, an intermediate member extending transversely from the upper cross member, and a lower cross member connected to the intermediate member spaced apart from the upper cross member and extending transversely from the intermediate member. A plastic frame substrate extends across a rear surface of a seat back and is mounted to the steel frame portion to structurally reinforce the steel frame portion with a reduced weight.

Another embodiment of the invention discloses a vehicle seat back frame having a steel frame portion for a seat back having an upper cross member, an intermediate member extending transversely from the upper cross member, and a lower cross member connected to the intermediate member spaced apart from the upper cross member and extending transversely from the intermediate member. A plastic frame substrate extends across a rear surface of a seat back and is mounted to the steel frame portion to structurally reinforce the steel frame portion with a reduced weight.

Yet another embodiment of the invention discloses a method for manufacturing a vehicle seat back frame by forming a steel frame portion with an upper cross member, an intermediate cross member and a lower cross member, with channels formed in each of the members. A plastic substrate is formed with a size to extend across the steel frame portion. The plastic substrate has ribs aligned with high stress regions of the steel frame portion under applicable loading, that are sized to extend into the channels of the corresponding members. The plastic substrate is mounted to the steel frame portion, thereby providing a vehicle seat back frame with a reduced weight.

BRIEF DESCRIPTION OF THE DRAWINGS

FIG. 1 is a partial perspective view of a vehicle seat according to an embodiment of the present invention; and FIG. 2 is a material stress diagram of a seat back frame component of the vehicle seat of FIG. 1;

FIG. 8 is a side perspective view of the seat back frame of FIG. 6; and

FIG. 9 is a front elevation view of the seat back frame of FIG. 6.

DETAILED DESCRIPTION OF EMBODIMENTS OF THE INVENTION

Figure 3:
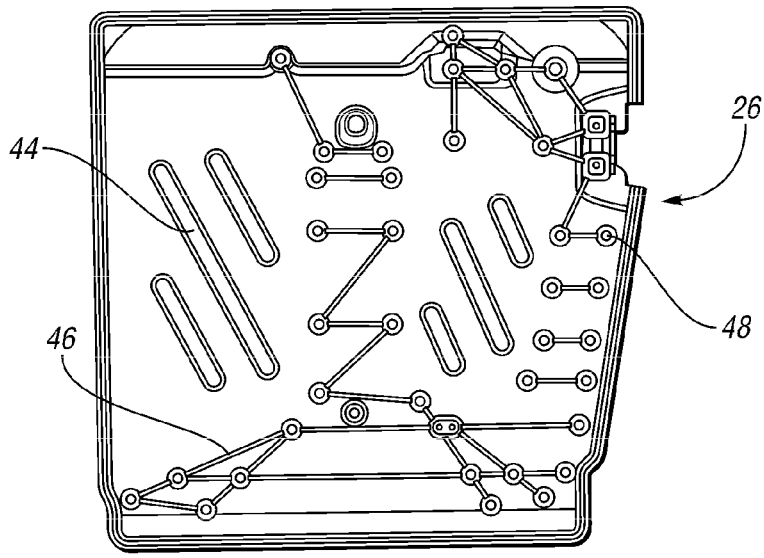
FIG. 3 is a front elevation view of a substrate of the vehicle seat of FIG. 1.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

With reference now to FIG. 1, a vehicle seat is illustrated and referenced generally by numeral 10, for use in a vehicle, such as an automobile. The seat 10 includes a seat cushion 12 that is mounted within the vehicle. The seat 10 also includes a seat back 14 that is mounted to one of the seat cushion 12 or the vehicle. The seat back 14 is illustrated partially disassembled with foam and a plastic cover removed for revealing underlying components of the seat back 14. The seat back 14 includes a frame 16 for structurally supporting the occupant and withstanding applicable loads.

In the embodiment depicted, the frame 16 is pivotally connected to the vehicle body by a pair of pivot shafts 18, 20. Further, the frame 16 that is depicted for this embodiment is for a split frame seating row, wherein the frame 16 provides the frame for two occupants, commonly referred to as a sixty percent seat of a sixty/forty seating row. The frame 16 supports two occupants that are buckled into the seating row with one occupant in the center seat, left side of FIG. 1, and another occupant in the outboard seat, right side of FIG. 1. Although a sixty percent seat frame is illustrated and described, the invention contemplates various applications including other sizes such as a forty percent seat frame of a split frame, a full frame, or any split frame dimension, within the spirit and scope of the present invention.

The vehicle seat 10 may be provided anywhere within an associated vehicle, such as a front row seat, a second row seat, or the like. The vehicle seat 10 that is depicted is utilized in a seat row that is adjacent to a storage compartment, such as a trunk. The seat cushion 12 may be mounted directly to the vehicle floor. The seat cushion can be mounted static to the floor with a recline mechanism between the cushion 12 and the seat back 14. In such an embodiment, the seat back 14 is mounted directly to a frame of the seat cushion 12 and the seat back does not include a locking mechanism with the vehicle. The seat cushion 12 is conventional in design and can be constructed in accordance with any suitable manner, including a structural frame covered by a foam pad layer and other finish cover material.

The seat back 14 includes a latch 22 for receiving a striker mounted on the vehicle body for latching the seat back 14 in an upright position as depicted in FIG. 1, and releasing the seat back 14 for a collapsed position upon the seat cushion 12. In the collapsed orientation of the seat back 14, a rear surface of the seat back 14 provides a portion of a load floor of the storage compartment, which thereby extends into the passenger compartment. The seat back 14 also includes a belt retractor 24 for the center seating position.

In the description, various embodiments and operating parameters and components of the embodiments are described with directional language, such as "inboard", "outboard", "above", "below", "upper", "lower", and words of similar import to designate directions shown in the drawings or are understood in the field of the art. Such directional terminology is used for relative description and clarity and is not intended to limit the orientation of any embodiment, or component of an embodiment, to a particular direction or orientation.

The frame 16 includes a substrate 26 that is formed from plastic and extends across the rear surface of the seat back 14. The steel frame portion 28 of at least one embodiment is formed from polypropylene with a glass fiber content of thirty percent (PP GF 30). Of course, any suitable structural plastic is contemplated within the spirit and scope of the present invention. Additionally, the substrate 26 can be formed by an injection molding process, or any other suitable forming process. The substrate 26 provides a load floor surface when the seat 10 is collapsed. A rear surface of the substrate 26 may include a covering, such as carpet, for enclosing the substrate 26 within the seat back 14.

The frame 16 also includes a steel frame portion 28 mounted to an inside of the substrate 26 in the seat back 14. The substrate 26 and steel frame portion 28 cooperate as shells that collectively provide the frame 16. In comparison to the prior art, the frame 16 provides a weight reduction of twenty-five percent, thereby reducing the weight of the seat 10 and improving the efficiency of the associated vehicle. Thus, the frame 16 meets the structural requirements of prior art seat frames with a reduced weight. The frame 16 has the same configuration for a prior art seat frame, but varies by materials and varies dimensionally as is described below.

The steel frame portion 28 can be formed by any suitable manufacturing method, such as stamping. The steel frame portion 28 includes an upper cross member 30 extending across an upper region of the substrate 26. An inboard side member 32 extends lengthwise along the substrate 26 from a lateral end of the upper cross member 30. An intermediate member 34 of the steel frame portion 28 extends from a central region of the upper cross member 30 lengthwise down the substrate 26. An outboard side member 36 extends from an outboard lateral end of the upper cross member 30 lengthwise along the substrate 26. A lower cross member 38 of the steel frame portion 28 extends across a lower region of the substrate 26 and is connected to the inboard side member 32, the intermediate member 34, and the outboard side member 36 of the steel frame portion 28.

The steel frame portion 28 includes two openings 40, 42 formed between the upper and lower cross members 30, 38 and the side and intermediate members 32, 34, 36. To structurally enhance the substrate 26 within these openings 40, 42, a plurality of structural projections 44 are formed on the substrate 26. The projections 44 may be integrally molded with the substrate 26.

Referring now to FIG. 2, a stress diagram of the steel frame portion 28 is illustrated. A sixty percent seat frame 16 is analyzed because the sixty percent seat frame 16 is subjected to greater loads than a forty percent seat frame due to the additional occupant. A rib design layout of the substrate was analyzed using topology optimization analysis software to calculate stresses associated with applicable loading requirements for the frame 16. The shading in FIG. 2 illustrates the stress profile for the steel frame portion 28 without the plastic substrate. The stress profile utilizes higher concentrated shading to depict locations of high stress loading in the steel frame portion 28. Based on the high stress locations, a plastic structural rib layout for the substrate 26 has been developed to strengthen the frame 16. This analysis was utilized to determine and to enhance the structural integrity of the steel frame portion 28.

Figure 4:
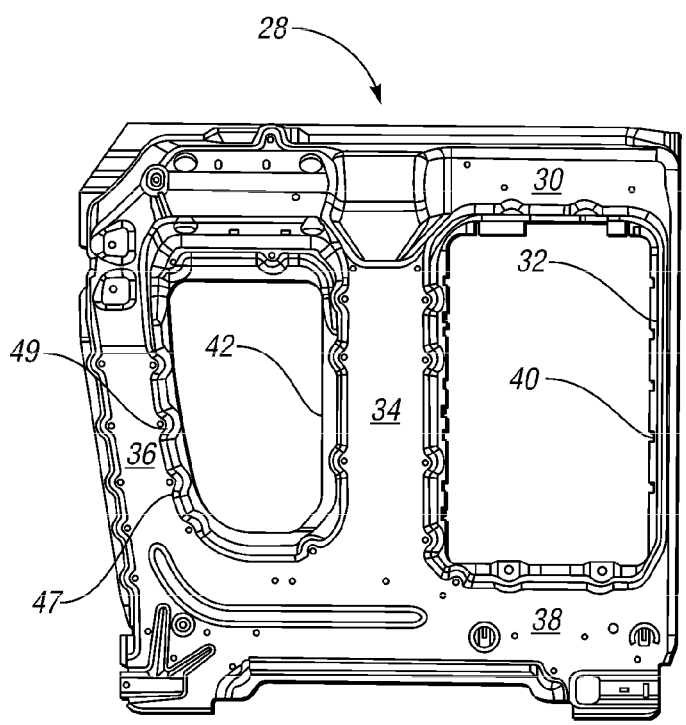
FIG. 4 is a rear elevation view of a seat back frame portion of the vehicle seat of FIG. 1.

Referring now to FIG. 3, the substrate 26 has a series of structural ribs 46 arranged to match the high stress regions of the steel frame portion 28. The structural ribs 46 extend from the substrate 26 to the steel frame portion 28 to thereby reduce the stress imparted on the steel frame portion 28. FIG. 4 illustrates a rear side of the steel frame portion 28. The steel frame portion 28 has a C-shaped profile along its structural members, thereby providing a channel 47 within each member. Likewise, the ribs 46 are sized to extend within the corresponding channels 47 for supporting the steel frame portion 28.

As stated above, the ribs 46 match the high stress profile. Accordingly, the ribs 46 are provided aligned with and extending into the channel 47 of the upper cross member 30 to engage the upper cross member 30 from a central region proximate to the belt retractor 24 to a laterally outboard region at the latch 22. The ribs 46 are also provided extending into the channel 47 of the lower cross member 38 along a width of the substrate 26 from one shaft 18 to the other shaft 20. Additionally, the ribs 46 are provided lengthwise within the channels 47 along the intermediate member 34 and the outboard side member 36.

Referring again to FIG. 3, the substrate 26 includes a series of bosses 48 that are formed within the web of ribs 46. The bosses 48 and ribs 46 are offset from the substrate 26 to engage the steel frame portion 28 within the channels 47 of the structural shell configuration of the steel frame portion 28. Likewise, and with reference to FIG. 4, the steel frame portion 28 includes a series of pockets 49 for receiving each of the bosses 48 of the substrate 26. Additionally, the bosses 48 are utilized for receiving fasteners, such as rivets 50 (FIG. 1), that connect the steel frame portion 28 to the substrate 26. Although rivets 50 are illustrated and described, any alternative connection can be employed, including a combination of mechanical fasteners and adhesives, or adhesives only.

Figure 5:
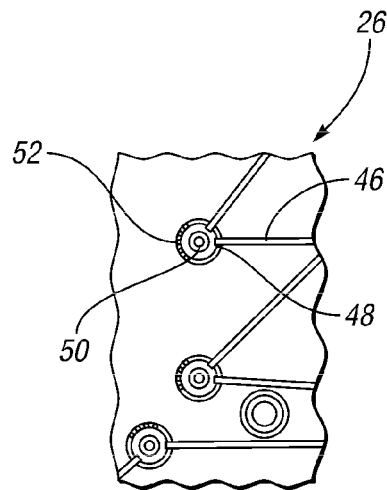
FIG. 5 is an enlarged view of a portion of the substrate of FIG. 3.

Referring now to FIG. 5, a portion of the substrate 26 is illustrated enlarged. A plurality of crush ribs 52 are provided about a periphery of each of the bosses 48. The crush ribs 52 are aligned to engage the associate pocket 49 during assembly. As the bosses 48 are inserted into the pockets 49, the crush ribs 52 are deformed, in other words crushed, to provide a mechanical interlock between the bosses 48 and the pockets 49.

Figure 7:
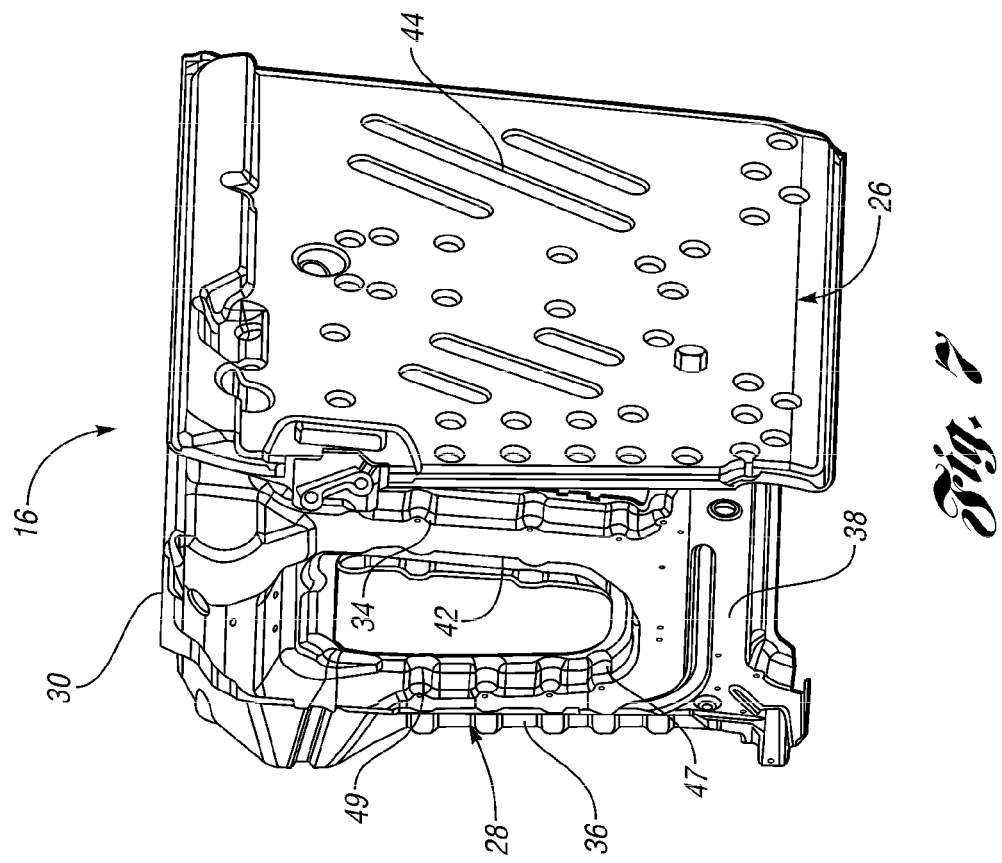
FIG. 7 is an exploded rear perspective view of the seat back frame of FIG. 6.
Figure 6:
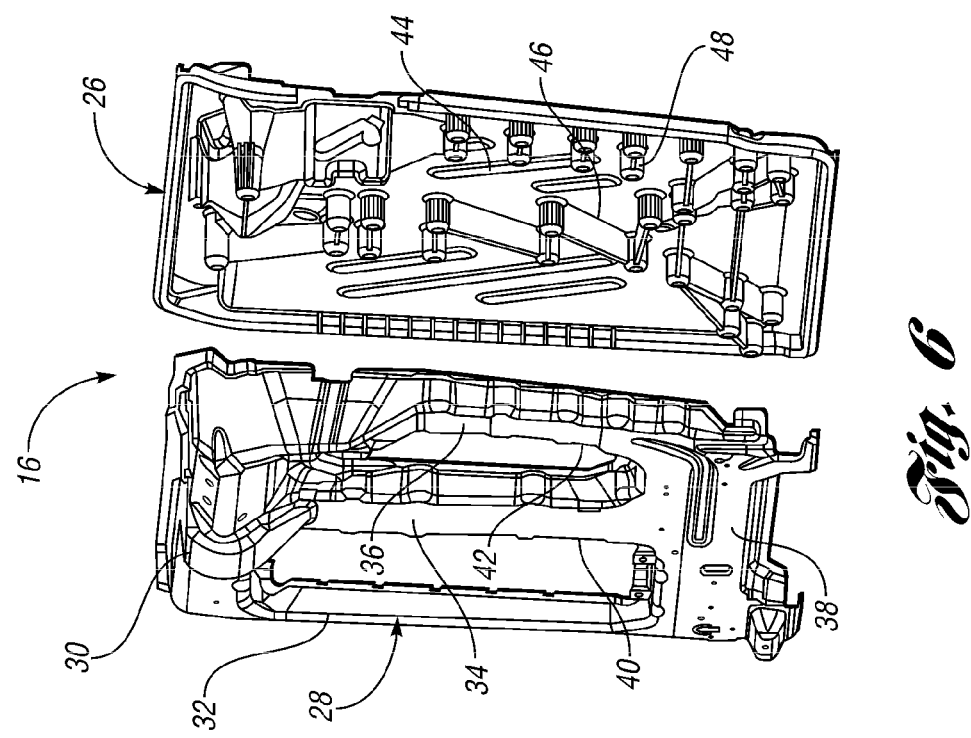
FIG. 6 is an exploded side perspective view of a seat back frame of the vehicle seat of FIG. 1.

FIGS. 6 and 7 illustrate the substrate 26 and the steel frame portion 28 exploded and aligned prior to assembly. As the frame is assembled the substrate 26 and the steel frame portion 28 are pressed together such that the bosses 48 are received in the pockets 49 and interlocked by the crush ribs 52, and the ribs 46 are received in the channels 47 and engaged to the corresponding members 30, 34, 36, 38. The assembled frame 16 is illustrated in FIGS. 8 and 9. Once the frame 16 is assembled, the substrate 26 is riveted to the steel frame portion 28 by the rivets 50. The assembled frame 16 is also illustrated in FIG. 1, which illustrates the cooperation of the ribs 34 in the channels 37 and the bosses 48 within the pockets 49.

Subsequent finite element analysis testing has determined that the frame 16 withstands the applicable loading for a seat back frame for a rear vehicle seat, such as the seat 10. The plastic substrate 26 provides a load floor in the folded position of the seat back 14 and also strengthens the steel frame portion 28 because the ribs 46, which are molded to the substrate 26 are received in the channels 47 and support the C-shaped profile of the steel frame portion 28. The plastic ribs 46 receive the structural loads including compressive loads and shearing loads. The frame 16 provides a higher stiffness than a prior art steel shell frame. Additionally, the weight of the frame 16 is twenty-five percent less than that of a conventional steel shell frame. Further, the welding operation has been replaced with a riveting operation.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat comprising:
   a steel frame portion for a seat back having an upper cross member, an intermediate member extending transversely from the upper cross member, and a lower cross member connected to the intermediate member spaced apart from the upper cross member and extending transversely from the intermediate member;
   a plastic frame substrate extending across a rear surface of the seat back and mounted to the steel frame portion to structurally reinforce the steel frame portion with a reduced weight; and
   a plurality of fasteners connecting the steel frame portion to the plastic frame substrate.

2. The vehicle seat of claim 1 wherein the intermediate member is generally centrally oriented relative to the upper and lower cross members.

3. The vehicle seat of claim 1 wherein the steel frame portion further comprises a side member connecting a lateral end of the upper cross member to a corresponding lateral end of the lower cross member.

4. The vehicle seat of claim 1 wherein the plastic substrate further comprises structural projections formed in regions between the upper and lower cross members.

5. The vehicle seat of claim 1 wherein the plastic substrate further comprises a plurality of structural ribs to reinforce the substrate.

6. The vehicle seat of claim 5 wherein the steel frame portion includes a cavity for receiving the plurality of ribs.

7. The vehicle seat of claim 5 wherein the structural ribs are aligned with the lower cross member of the steel frame portion.

8. The vehicle seat of claim 5 wherein the structural ribs are aligned with the intermediate member of the steel frame portion.

9. The vehicle seat of claim 5 wherein the structural ribs are aligned with a region of the upper cross member of the steel frame portion from an intersection with the intermediate member to an outboard lateral end of the upper cross member.

10. The vehicle seat of claim 5 wherein the steel frame portion further comprises an outboard side member connected to an outboard lateral end of the upper cross member and an outboard lateral end of the lower cross member, and the structural ribs are aligned with the outboard side member.

11. The vehicle seat of claim 1 wherein the fasteners further comprise rivets.

12. The vehicle seat of claim 1 wherein the plastic substrate further comprises a plurality of bosses for receiving the fasteners.

13. The vehicle seat of claim 12 wherein the steel frame portion further comprises a series of pockets for receiving the bosses of the plastic substrate for mounting the plastic substrate to the steel frame portion.

14. The vehicle seat of claim 13 wherein the plastic substrate further comprises a plurality of crush ribs formed about a periphery of each boss for structurally enhancing the engagement of the boss within the associate pocket.

15. The vehicle seat of claim 1 further comprising a shaft mounted to the lower cross member for providing a pivotal connection of the seat back to a vehicle body.

16. The vehicle seat of claim 15 wherein the substrate provides a load floor along the seat back in a collapsed position of the seat back.

17. The vehicle seat of claim 15 further comprising a locking mechanism mounted to the upper cross member for cooperating with the vehicle body for locking the seat back in a seating position.

18. A method for manufacturing a vehicle seat back frame comprising:
   forming a steel frame portion with an upper cross member, an intermediate cross member and a lower cross member, with channels formed in each of the members;
   forming a plastic substrate sized to extend across the steel frame portion with ribs on the plastic substrate aligned with high stress regions of the steel frame portion under applicable loading, the ribs being sized to extend into the channels of the corresponding members; and
   mounting the plastic substrate to the steel frame portion so that the ribs extend into the channels of the corresponding members, thereby providing a vehicle seat back frame with a reduced weight.

19. A vehicle seat comprising:
   a steel frame portion for a seat back having an upper cross member, an intermediate member extending transversely from the upper cross member, and a lower cross member connected to the intermediate member spaced apart from the upper cross member and extending transversely from the intermediate member; and
   a plastic frame substrate extending across a rear surface of the seat back and mounted to the steel frame portion to structurally reinforce the steel frame portion with a reduced weight;

wherein the plastic substrate further comprises a plurality of structural ribs to reinforce the substrate; and wherein the steel frame portion includes a cavity for receiving the plurality of ribs.

20. The vehicle seat of claim 19 further comprising a plurality of fasteners connecting the steel frame portion to the plastic frame substrate;

wherein the plastic substrate further comprises a plurality of bosses for receiving the fasteners; and wherein the steel frame portion further comprises a series of pockets for receiving the bosses of the plastic substrate for mounting the plastic substrate to the steel frame portion.

* * * * *